United States Patent [19]

Yamamoto et al.

[11] Patent Number: 5,681,879
[45] Date of Patent: Oct. 28, 1997

[54] FLAME-RETARDANT POLYESTER RESIN COMPOSITION

[75] Inventors: Masanori Yamamoto; Michio Kawai, both of Yokohama, Japan

[73] Assignee: Mitsubishi Chemical Corporation, Tokyo, Japan

[21] Appl. No.: 499,664

[22] Filed: Jul. 6, 1995

[30] Foreign Application Priority Data

Jul. 7, 1994 [JP] Japan .................. 6-155931

[51] Int. Cl.$^6$ .................................. C08K 5/053
[52] U.S. Cl. ................ 524/373; 524/281; 524/288; 524/3
[58] Field of Search ............... 524/281, 58, 386, 524/387, 389, 373, 383, 288, 411, 412, 56; 528/299

[56] References Cited

U.S. PATENT DOCUMENTS

| | | | |
|---|---|---|---|
| 2,437,046 | 3/1948 | Rothrock et al. | 524/386 |
| 2,459,746 | 1/1949 | Radcliffe | 524/387 |
| 2,734,881 | 2/1956 | Lally et al. | 524/387 |
| 2,918,451 | 12/1959 | Elliott | 524/387 |
| 2,956,975 | 10/1960 | Greenspan | 524/114 |
| 2,959,566 | 11/1960 | Burgert et al. | 524/114 |
| 2,962,464 | 11/1960 | Feild | 524/387 |
| 3,658,744 | 4/1972 | Brindell et al. | 524/386 |
| 3,856,746 | 12/1974 | Susuki | 524/386 |
| 3,867,332 | 2/1975 | Chimura et al. | 524/386 |
| 3,960,806 | 6/1976 | Najour et al. | 528/299 |
| 4,222,926 | 9/1980 | Mizuno et al. | |
| 4,338,245 | 7/1982 | Halpern . | |
| 4,456,719 | 6/1984 | Yamamoto et al. | 524/411 |
| 4,666,965 | 5/1987 | Aoki | 524/412 |
| 4,680,324 | 7/1987 | Malwitz | 524/58 |
| 4,767,810 | 8/1988 | Nelson | 524/386 |
| 4,871,795 | 10/1989 | Pawar | 524/387 |
| 4,873,279 | 10/1989 | Nelson | 524/386 |
| 4,963,606 | 10/1990 | Schleifsten | 524/386 |
| 5,021,295 | 6/1991 | Nakane et al. . | |

FOREIGN PATENT DOCUMENTS

| | | |
|---|---|---|
| 0 048 483 | 3/1982 | European Pat. Off. . |
| 2 322 900 | 4/1977 | France . |
| 50-30673 | 10/1975 | Japan . |
| 2 076 398 | 12/1981 | United Kingdom . |
| 2 142 638 | 1/1985 | United Kingdom . |

OTHER PUBLICATIONS

Database WPI, Derwent Publications, Ltd., AN–82–14384E, JP–1–32259, Jun. 30, 1989.

*Primary Examiner*—Veronica P. Hoke
*Attorney, Agent, or Firm*—Oblon, Spivak, McClelland, Maier & Neustadt, P.C.

[57] ABSTRACT

The disclosure describes a flame-retardant polyester resin composition comprising: (1) 100 parts by weight of a polyester resin which may contain a halogen atom;

(2) 0.01 to 5 parts by weight of a polyhydric alcohol having not less than 3 hydroxyl groups in the molecule with a hydroxyl group concentration of $1.0\times10^{-2}$ to $3.5\times10^{-2}$ eq/g;

(3) 0 to 20 parts by weight of an inorganic flame retarding synergist; and (4) 0 to 50 parts by weight of a halogen-based flame retardant, the halogen content in the composition being 0.1 to 20% by weight.

10 Claims, No Drawings

FLAME-RETARDANT POLYESTER RESIN COMPOSITION

BACKGROUND OF THE INVENTION

The present invention relates to a flame-retardant polyester resin composition having high flame retardancy, good smoke suppression and excellent mechanical and electrical properties.

Polyester resins are widely used in manufacture of various commercial products such as automobile parts, household electric appliances, office appliances, industrial parts, textile products, building materials, miscellaneous articles and the like. Recently, requirements have has intensified for a material having not only excellent mechanical properties but also high flame retardancy in use for the said commercial products.

Various types of organic and inorganic flame retardants are known, but halogen-based organic flame retardants blended with an inorganic compound such as antimony trioxide as flame retarding synergist are popularly used for preparation of flame-retardant polyester resins. However, in practical use of the conventional flame-retardant polyesters as material of electrical and electronic parts, especially in use under a high-temperature condition or in long-time use, there has been the serious problem that the flame retardant or the decomposition products thereof could bleed out to the surface of the molded product, giving rise to various troubles such as contact failure, lowering of insulation, spoiling of appearance, etc. As a means for solving this problem, combined use of an epoxy compound or an oxazoline compound has been proposed (Japanese Patent Publication (KOKOKU) Nos. 1-32259 and 1-60056, and Japanese Patent Application Laid-open (KOKAI) No. 2-588557). Use of such compounds can indeed provide a certain suppression on generation of gases by thermal decomposition, but it is still unsatisfactory for the aim and may give rise to a new problem that the composition is thickened in the detention time in the molding operations and deteriorated in fluidity.

On the other hand, use of flame-retardant polyester resins is restricted by the negative factors such as corrosion of the molding die by gases such as hydrogen halide generated on thermal decomposition of the flame retardant and deterioration of mechanical properties due to massive blending of the flame retardant. These flame retardants also have the problem that a large volume of black smoke or poisonous halogen-containing gases may be generated in the event of occurrence of a fire toimpede seeking of refuge, and multiply human injuries and loss of material. Moreover, reports have been made recently suggesting the possibility of generation of dangerous dioxin as a thermal decomposition product of halogen compounds, and regulation is being tightened on use of halogen compounds. Metal hydroxides such as aluminum hydroxide and magnesium hydroxide, and certain phosphoric substances such as red phosphorus and phosphoric esters are known as flame retardants free of halogens, but these substances involve many problems relating to flame retardancy, physical properties, moldability, etc. As for polyester resins, there is yet available none which is superior to halogen-based flame retardants.

Still further, voluminous use of inorganic compounds such as antimony trioxide, which are popularly used as flame retarding synergist, comes into a the difficult problem of waste disposal. Under these circumstances, development of techniques for improving flame retardancy of polyesters using halogen-based flame retardants and for minimizing the amount of halogen-based flame retardants or antimony compounds used for preparation of flame-retardant polyesters has been ardently desired.

As a result of extensive studies on the subject matter by the present inventors, it has been found that by adding (i) 0.01 to 5 parts by weight of a polyhydric alcohol having not less than 3 hydroxyl groups in the molecule with a hydroxyl group concentration of $1.0\times10^{-2}$ to $3.5\times10^{-2}$ equivalent/g, (ii) not more than 20 parts by weight of an inorganic flame retarding synergist and (iii) not more than 50 parts by weight of a halogen-based flame retardant based on 100 parts by weight of a polyester resin which may contain a halogen, adjusting the halogen content in the resin composition to 1 to 15% by weight, the obtained polyester resin composition has high flame retardancy, excellent electrical and mechanical properties and good smoke suppression, and is capable of preventing deterioration of contact characteristic and insulation property of electric and electronic parts made of such resin and also inhibiting generation of corrosive gases during molding works or generation of stimulant gases, corrosive gases and black smoke when the resin is burned. The present invention has been attained on the basis of the above finding.

SUMMARY OF THE INVENTION

The present invention is aimed at providing a flame-retardant polyester resin composition which can eliminate or minimize the possibility of causing contact failure or insulation failure of electric and electronic parts made of such resin composition, scarcely generates corrosive gases in the molding operations or stimulant gases, corrosive gases and black smoke when the composition is burned, and also has excellent mechanical and electrical properties.

To accomplish the aim, in a first aspect of the present invention, there is provided a flame-retardant polyester resin composition comprising:

(1) 100 parts by weight of a polyester resin which may contain a halogen atom, (2) 0.01 to 5 parts by weight of a polyhydric alcohol having not less than 3 hydroxyl groups in the molecule with a hydroxyl group concentration of $1.0\times10^{-2}$ to $3.5\times10^{-2}$ equivalent/g, (3) 0 to 20 parts by weight of an inorganic flame retarding synergist, and (4) 0 to 50 parts by weight of a halogen-based flame retardant, the halogen content in the resin composition being 0.1 to 20% by weight.

In a second aspect of the present invention, there is provided a flame-retardant polyester resin composition comprising:

(1) 100 parts by weight of a polyester resin which may contain a halogen atom, (2) 0.01 to 5 parts by weight of a polyhydric alcohol having not less than 3 hydroxyl groups in the molecule with a hydroxyl group concentration of $1.0\times10^{-2}$ to $3.5\times10^{-2}$ equivalent/g, (3) 0 to 20 parts by weight of an inorganic flame retarding synergist, and (4) 1 to 50 parts by weight of a halogen-based flame retardant, the halogen content in the resin composition being 0.1 to 20% by weight.

In a third aspect of the present invention, there is provided a flame-retardant polyester resin composition comprising:

(1) 100 parts by weight of a halogen-containing copolymer polyester represented by the formula (IV) described later;

(2) 0.01 to 5 parts by weight of a polyhydric alcohol having not less than 3 hydroxyl groups in the molecule with a hydroxyl group concentration of $1.0\times10^{-2}$ to $3.5\times10^{-2}$ eq/g; and (3) 0 to 20 parts by weight of an inorganic flame retarding synergist, the halogen content in the composition being 0.1 to 20% by weight.

In a fourth aspect of the present invention, there is provided a flame-retardant polyester resin composition comprising:

(1) 100 parts by weight of a polyester resin which may contain a hydrogen atom;

(2) 0.01 to 5 parts by weight of a polyhydric alcohol having not less than 3 hydroxyl groups in the molecule with a hydroxyl group concentration of $1.0\times10^{-2}$ to $3.5\times10^{-2}$ eq/g; and (3) 0 to 50 parts by weight of a halogen-based flame retardant, the halogen content in the composition being 0.1 to 20% by weight.

In a fifth aspect of the present invention, there is provided electric or electronic parts molded from a flame-retardant polyester resin composition comprising:

(1) 100 parts by weight of a polyester resin which may contain a halogen atom, (2) 0.01 to 5 parts by weight of a polyhydric alcohol having not less than 3 hydroxyl groups in the molecule with a hydroxyl group concentration of $1.0\times10^{-2}$ to $3.5\times10^{-2}$ equivalent/g, (3) 0 to 20 parts by weight of an inorganic flame retarding synergist, and (4) 0 to 50 parts by weight of a halogen-based flame retardant, the halogen content in the resin composition being 0.1 to 20% by weight.

DETAILED DESCRIPTION OF THE INVENTION

The polyester resin which may have a halogen, used as a component of the resin composition according to the present invention, is a thermoplastic polyester having an intrinsic viscosity of not less than 0.40, which can be obtained from polycondensation of at least one dicarboxylic acid and at least one glycol. The dicarboxylic acids usable as a polycondensation reactant in the present invention include the compounds represented by the following formula (V):

$$HOOC-R^{12}-COOH \quad (V)$$

wherein $R^{12}$ represents

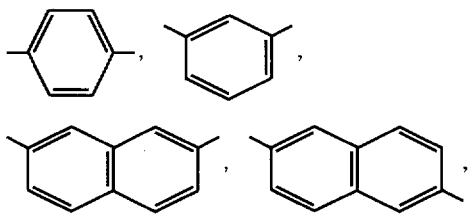

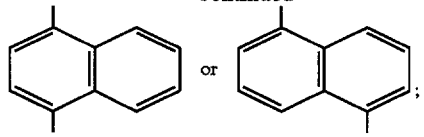

aromatic dicarboxylic acids such as P,P'-diphenyldicarboxylic acid, P,P'-diphenyl ether dicarboxylic acid, etc.; aliphatic dicarboxylic acids such as adipic acid, sebacic acid, dodecanoic diacid, suberic acid, azelaic acid, etc.; esters such as aromatic dicarboxylic acid esters, preferably terephthalic diesters, aliphatic dicarboxylic acid esters, etc.; dicarboxylic acid derivatives of acid chlorides such as terephthaloyl chloride, etc.; and the like.

Of these dicarboxylic acids, aromatic dicarboxylic acids and esters thereof are preferred, and aromatic dicarboxylic acids and esters thereof represented by the formula (V) are more preferred. Terephthalic acid and terephthalic diesters such as dimethyl terephthalate are especially preferred. These dicarboxylic acids may be used either singly or as a mixture of two or more of dicarboxylic acids.

The glycols usable as another polycondensation reactant in the present invention include linear alkylene glycols (hereinafter referred to as alkylene glycols) represented by the following formula (VI):

$$HO(CH_2)_nOH \quad (VI)$$

(wherein n is an integer of 2 to 30, preferably 2 to 10, more preferably 2 to 4), such as ethylene glycol and 1,4-butanediol, other glycols such as neopentyl glycol, 1,4-cyclohexanediol, 1,4-cyclohexanedimethanol, bisphenol A, polyoxyethylene glycol, polyoxytetramethylene glycol, halogen-containing aromatic diols, etc., and derivatives thereof such as glycidyl ethers, etc.

Of these glycols, linear alkylene glycols, especially ethylene glycol and 1,4-butadienediol are preferred. Halogen-containing aromatic diols are also preferably used. "Halogen-containing aromatic diols" refer to diols having a structure in which the hydrogen atom in the aromatic ring is substituted with a halogen atom such as bromine or chlorine atom. Of these diols, those represented by the following formula (III) are preferred:

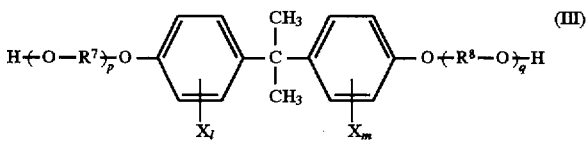

wherein $R^7$ and $R^8$ represent independently an alkylene group having 2 to 30 carbon atoms, preferably 2 to 20 carbon atoms, more preferably 2 to 4 carbon atoms; X represents a halogen atom such as bromine or chlorine atom; l and m are each an integer of 1 to 4, preferably 1 to 2, more preferably 2; and p and q are each an integer of 1 to 20, preferably 1 to 10, more preferably 1 to 3.

Of the diols specified above, those represented by the following formula (VII) are especially preferred:

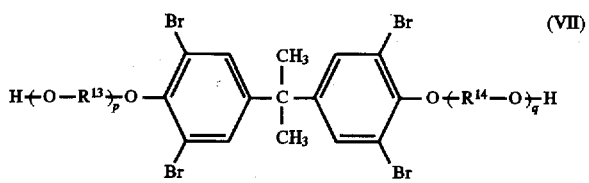

wherein $R^{13}$ and $R^{14}$ represent independently an alkylene group same as $R^7$ and $R^8$ in the formula (III); and p and q are each an integer of 1 to 20, preferably 1 to 10, more preferably 1 to 3.

It is possible to use a single glycol or a mixture of two or more different glycols.

Polyester resin obtained from polycondensation of at least one bifunctional dicarboxylic acid and at least one glycol mentioned above is preferably a polyalkylene terephthalate, a halogen-containing copolymer polyester or a composition thereof.

Examples of polyalkylene terephthalates usable here are polyethylene terephthalate, polybutylene terephthalate and the like produced by using terephthalic acid or a derivative thereof as dicarboxylic acid moiety.

Halogen-containing copolymer polyesters mentioned above can be obtained by copolymerizing (A) aromatic dicarboxylic acids or derivatives thereof, preferably aromatic dicarboxylic acids represented by the above-shown formula (V) or derivatives thereof, (B) alkylene glycols represented by the above-shown formula (VI) or derivatives thereof, and (C) halogen-containing diols represented by the above-shown formula (V) or derivatives thereof.

Of these halogen-containing copolymer polyesters, those represented by the following formula (IV) are preferred:

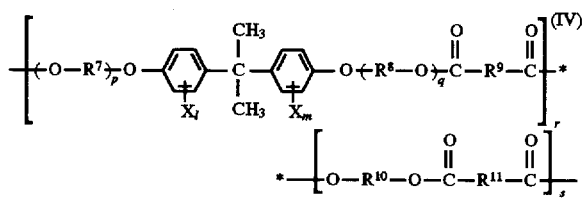

wherein $R^7$, $R^8$ and $R^{10}$ represent independently an alkylene group having 2 to 30 carbon atoms; $R^9$ and $R^{11}$ represent independently

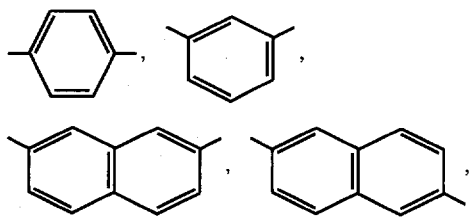

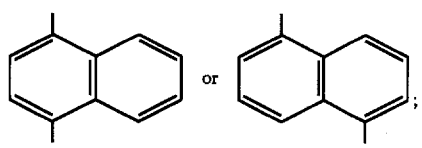

X represents a halogen atom; l and m are each an integer of 1 to 4; p and q are each an integer of 1 to 20; and r and s are each an integer of 1 or more.

The halogen content in the said copolymers is usually 1 to 20% by weight, preferably 3 to 15% by weight.

These copolymers may be used either singly or as a blend with other polyesters, preferably polyalkylene terephthalate. The blending ratio of the said other polyester to the said halogen-containing polyester copolymer is not limited, it may be properly selected from the range of 0–100/100–0 (other polyester/halogen-containing polyester copolymer), preferably 10–90/90–10, more preferably 20–80/80–20, still more preferably 20–60/80–40 (% by weight).

In the present invention, copolymers such as oxycarboxylic acids can be used as a copolymer component of the polyester resin. Typical examples of such oxycarboxylic acids are oxybenzoic acid, 4-(2-hydroxyethoxy)benzoic acid, and ester-forming derivatives thereof.

Halogen-based flame retardant used as another component of the resin composition of the present invention is selected from organic flame retardants having fluorine, chlorine and/or bromine atoms. Bromine-based flame retardants are preferred.

Examples of bromine-based flame retardants include alicyclic bromine compounds such as hexabromocyclohexane and hexabromocyclododecane; aromatic bromine compounds such as hexabromobenzene, pentabromotoluene, pentabromoethylbenzene and tribromostyrene; brominated diphenyl ethers such as decabromodiphenyl ether, octabromodiphenyl ether and hexabromodiphenyl ether; brominated phenols and derivatives thereof such as tribromophenol, dibromophenol, tetrabromobisphenol A, bis(tribromophenoxy)ethane; brominated epoxy compounds such as tetrabromobisphenol A expoxy represented by the following structural formula:

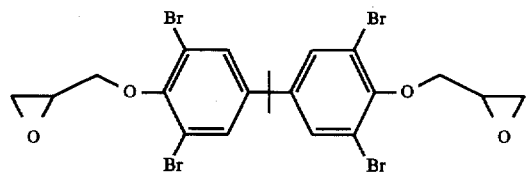

imide compounds such as tribromodiphenylmaleimide and ethylenebistetrabromophthalimide; tetrabromobisphenol A carbonate oligomers represented by the following structural formula:

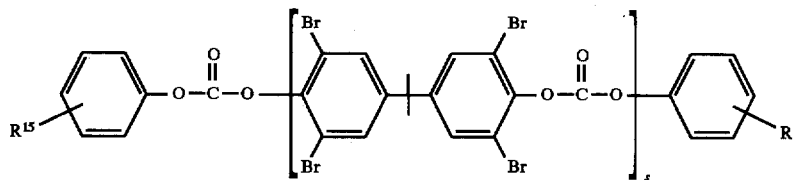

(wherein $R^{15}$ is a lower alkyl group having not more than 6 carbon atoms, and s is an integer of 1 to 10); oligomers of bromine-containing compounds such as brominated epoxy oligomers represented by the following structural formula:

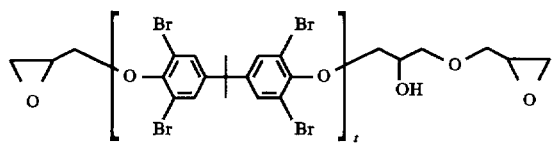

(wherein t is an integer of 1 to 10); and polymers of bromine-containing compounds such as brominated polystyrene, brominated polyphenylene oxide and poly (pentabromobenzyl) acrylate. Of these bromine-based flame retardants, those having aromatic rings in the molecular structure are preferred.

For preventing bleedout, those of an oligomer-type structure, a polymer-type structure or a structure having a reactive group such as epoxy group are preferred. Of them, tetrabromobisphenol A carbonate oligomers, brominated epoxy oligomers, poly(pentabromobenzyl) acrylate and brominated epoxy compounds are especially preferred.

Halogen-based flame retardant is added in an amount of 1 to 50 parts by weight, preferably 3 to 30 parts by weight, more preferably 5 to 20 parts by weight based on 100 parts by weight of polyester. When the amount of halogen-based flame retardant is less than 1 part by weight, the composition proves unsatisfactory in flame retardancy. When the amount of the said halogen-based flame retardant exceeds 50 parts by weight, the polymer properties are intolerably deteriorated, and also there may take place bleedout of the flame retardant or the decomposition product thereof.

Polyhydric alcohol compound used in the present invention is a compound having not less than 3 hydroxyl groups in the molecule with a hydroxyl group concentration of $1.0 \times 10^{-2}$ to $3.5 \times 10^{-2}$ eq/g.

Preferred examples of such polyhydric alcohol compounds are compounds having an α,β-diol structure represented by the following formula:

Of these polyhydric alcohol compounds, those represented by the following formula (I) are more preferred:

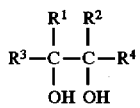

wherein $R^1$ and $R^2$ represent independently a hydrogen atom or a $C_1$–$C_3$ alkyl group; $R^3$ represents a $C_1$–$C_{30}$ alkyl group, $C_3$–$C_{30}$ cycloalkyl group, $C_6$–$C_{30}$ aryl group, $C_1$–$C_{30}$ alkoxyl group or $C_6$–$C_{30}$ aryloxy group, which have one or more hydroxyl groups, preferably an alkyl group having one or more hydroxyl groups; $R^4$ represents a hydrogen atom or a $C_1$–$C_{30}$ alkyl group, $C_3$–$C_{30}$ cycloalkyl group or $C_6$–$C_{30}$ aryloxy group, which may have a substituent such as hydroxyl group, ether group, epoxy group, carboxyl group, carbonyl group, ester group or amino group; $R^4$ is preferably a hydrogen atom or a $C_1$–$C_{30}$ alkyl group having a substituent, more preferably a $C_1$–$C_{30}$ alkyl group substituted with a hydroxy or epoxy group; $R^3$ and $R^4$ may combine to form a ring having a hydroxyl group at an arbitrary position. The preferable carbon number of $R^3$ and $R^4$ is 1 to 20, more preferably 1 to 10, still more preferably 1 to 5.

The compounds represented by the above formula (I) include linear polyhydric alcohols such as glycerin, 1,2,3-butanetriol, 1,2,4-butanetriol, erythritol, ribitol, xylitol, dulcitol and sorbitol; cyclic polyhydric alcohols such as 1,2,3-cyclohexatriol and inositol; saccharides such as glucose, galactose, mannose, galacturonic acid, xylose, glucosamine and galactosamine. Of these compounds, linear polyhydric alcohols are preferred, and those having not less than 4 carbon atoms, preferably 4 to 20 carbon atoms, are especially suited for use in the present invention.

The preferred polyhydric alcohols for use as a component of the resin composition of the present invention are also the compounds represented by the following formula (II):

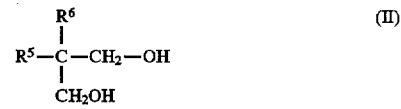

wherein $R^5$ represents $C_1$–$C_{30}$ alkyl group, $C_3$–$C_{30}$ cycloalkyl group, $C_6$–$C_{30}$ aryl group, $C_1$–$C_{30}$ alkoxy group or $C_6$–$C_{30}$ aryloxy group, which have one or more hydroxyl groups, preferably a $C_1$–$C_{30}$ alkyl group; and $R^6$ represents a hydrogen atom or an $C_1$–$C_{30}$ alkyl group, $C_3$–$C_{30}$ cycloalkyl group, $C_6$–$C_{30}$ aryl group, $C_1$–$C_{30}$ alkoxy group or $C_6$–$C_{30}$ aryoxy group, which may have a substituent such as hydroxyl group, ether group, epoxy group, carboxyl group, carbonyl group, ester group or amino group, preferably a hydrogen atom, a $C_1$–$C_{30}$ alkyl group or a $C_1$–$C_{30}$ alkyl group, which have a hydroxyl group. The preferable carbon number of $R^5$ and $R^6$ is 1 to 20, more preferably 1 to 10, still more preferably 1 to 5.

Example of the compounds represented by the formula (II) includes 1,1,2,2-tetramethyloylcyclohexane, 1,1,1-trimethylolpropane, 1,1,2-trimethyloylpropane, 1,1,1-trimethylolbutane, 1,1,2-trimethylolbutane, 1,1,1-trimethylolpentane, 1,1,2-trimethylolpentane, 1,2,2-trimethylolpentane, trimethylolpentane, pentaerythritol and dipentaerythritol. Of these compounds, 1,1,1-trimethylolpropane, pentaerythritol and dipentaerythritol are preferred, and pentaerythritol is more preferred.

It is also possible to use the compounds represented by the following formula:

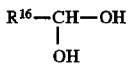

(wherein $R^{16}$ represents an $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryoxy group, which have a hydroxyl group, the preferable carbon number of $R^{14}$ being 1 to 20, more preferably 1 to 10, still more preferably 1 to 5), such as 1,1,3,3-tetrahydroxypropane, 1,1,5,5-tetrahydroxypentane, 2,2,6,6-tetrakis(hydroxymethyl)cyclohexane and 2,2,6,6-tetrakis (hydroxymethyl)cyclohexanol.

"Hydroxyl group concentration" in the polyhydric alcohol compound used in the present invention is the quotient of a division of the total number of hydroxyl groups (N) contained in the polyhydric alcohol by the molecular weight (W) of the polyhydric alcohol:

Hydroxyl group concentration=N/W (eq/g)

In the present invention, hydroxyl group concentration in the polyhydric alcohol is $1.0 \times 10^{-2}$ to $3.5 \times 10^{-2}$ eq/g, preferably $1.5 \times 10^{-2}$ to $3.5 \times 10^{-2}$ eq/g. The higher is the hydroxyl group concentration in the above-defined range, the better result can be obtained. When the concentration is below $1.0 \times 10^{-2}$ eq/g, no satisfactory flame retarding effect can be obtained.

Polyhydric alcohol compound is added in an amount of 0.01 to 5 parts by weight, preferably 0.05 to 5 parts by weight, more preferably 0.1 to 3 parts by weight, still more preferably 0.3 to 2 parts by weight based on 100 parts by weight of the polyester resin which may contain a halogen. When the amount of the said alcohol compound is less than 0.01 part by weight, desired flame retardancy can not be obtained, and when its amount exceeds 5 parts by weight, the polymer properties are adversely affected.

As inorganic flame retarding synergist in the resin composition of the present invention, there can be used antimony compounds such as antimony trioxide, antimony tetraoxide, antimony pentoxide, antimony halide and sodium antimonide; metal hydroxides such as aluminum hydroxide and magnesium hydroxide; borides such as zinc boride and barium boride; tin compounds such as tin dioxide and zinc stannate; and molybdenum compounds such as molybdenum oxide. Of these compounds, antimony compounds are preferred and antimony trioxide is especially preferred.

The flame retarding synergist is added in an amount of 0 to 20 parts by weight, preferably 0 to 10 parts by weight, more preferably 1 to 10 parts by weight based on 100 parts by weight of the polyester resin which may contain a halogen. If the amount of the said flame retarding synergist exceeds 20 parts by weight, an intolerable deterioration of the polymer properties is provoked.

As explained above, the polyester resin composition of the present invention comprises:

(1) 100 parts by weight of a polyester resin which may contain a halogen;

(2) 0.01 to 5 parts by weight of a polyhydric alcohol compound having not less than 3 hydroxyl groups in the molecule with a hydroxyl group concentration of $1.0 \times 10^{-2}$ to $3.5 \times 10^{-2}$ eq/g;

(3) 0 to 20 parts by weight of an inorganic flame retarding synergist; and (4) 0 to 50 parts by weight of a halogen-based flame retardant, the halogen content in the said resin composition being 0.1 to 20% by weight.

It is imperative that the halogen content in the polyester resin composition (total amount of the components (1) to (4)) is 0.1 to 20% by weight, preferably 1 to 15% by weight, more preferably 2 to 10% by weight. When the halogen content is less than 0.1% by weight, no satisfactory flame retardancy is provided, and when the halogen content exceeds 20% by weight, there may take place a deterioration of mechanical properties and contact failure.

According to the present invention, since the flame retardancy can be greatly enhanced by the presence of a specific polyhydric alcohol, it is possible to remarkably reduce the halogen content in the resin composition and the amount of inorganic flame retarding synergist which needs to be added, making it possible to significantly improve mechanical and contact properties without reducing a flame retardancy of the molded product. Further, since high flame retardancy can be obtained without using an inorganic flame retarding synergist such as antimony trioxide which is considered harmful to human beings, it is possible to obtain a molded product which is lightweight, has high impact resistance and elongation at break, and exerts no adverse influence to the environment.

Also, according to the present invention, in case of using polyalkylene terephthalate as polyester resin, there is provided a polyester resin composition with excellent flame retardancy, comprising:

(1) 100 parts by weight of a polyalkylene terephthalate resin;

(2) 0.01 to 5 parts by weight of a polyhydric alcohol having not less than 3 hydroxyl groups in the molecule with a hydroxyl group concentration of $1.0 \times 10^{-2}$ to $3.5 \times 10^{-2}$ eq/g;

(3) 0 to 20 parts by weight of an inorganic flame retarding synergist; and (4) 1 to 50 parts by weight of a halogen-based flame retardant, the halogen content in the resin composition being 0.1 to 20% by weight.

Further, in case a halogen-containing copolymer polyester resin represented by the formula (VI) shown above is used as polyester resin, there is provided a flame-retardant polyester resin composition comprising:

(1) 100 parts by weight of a halogen-containing copolymer polyester resin represented by the formula (VI);

(2) 0.01 to 5 parts by weight of a polyhydric alcohol having not less than 3 hydroxyl groups in the molecule with a hydroxyl group concentration of $1.0 \times 10^{-2}$ to $3.5 \times 10^{-2}$ eq/g; and (3) 0 to 20 parts by weight of an inorganic flame retarding synergist, the halogen content in the composition being 0.1 to 20% by weight.

Use of the said halogen-containing copolymer polyester can realize excellent flame retardancy without adding any halogen-based flame retardant, so that it is possible to maintain high mechanical properties of the polymer and to eliminate the risk of bleedout or contact failure attributable to the presence of halogen-based flame retardant or its decomposition product.

The composition of the present invention may contain other thermoplastic polymer(s) such as polycarbonates, ABS resins, polyphenylene ethers, etc., and any mixture composed of not less than 60% by weight of polyester and not more than 40% by weight of other thermoplastic polymer(s) is embraced within the concept of the present invention.

The composition of the present invention may also contain other substances commonly used in this field, such as thermal stabilizer, light stabilizer, ultraviolet absorber, antioxidant, antistatic agent, antiseptic, adhesion accelerator, colorant, crystallization accelerator, filler, glass fiber, carbon fiber, foaming agent, lubricant, sterilizer, plasticizer, releasing agent, thickener, drip-proofing agent, impact improver, smoke suppressant, etc.

The resin composition of the present invention can be produced by the known methods, for example, a method comprising dry-blending the component materials by a suitable blender or mixer, or a method in which the component materials are melted and mixed by using an extruder. Usually the component materials are melted and mixed, and then extruded into a strand by a screw extruder and the strand is pelletized.

The polyester resin composition of the present invention can be easily molded by various known molding methods such as injection molding, extrusion molding, compression molding, etc., and the molded product has high flame retardancy and excellent mechanical properties and therefore has a high utility value. The resin composition of the present invention is particularly useful application to electrical and electronic parts, specifically relays, switches, coil bobbins, connectors and the like.

The flame-retardant polyester resin composition of the present invention had the evaluation grading of V-O in a UL-94 standard vertical flame test.

The polyester resin composition of the present invention is characterized by the fact that it can eliminate or minimize the risk of contact and insulation failure of electrical and electronic parts made of the said resin composition, scarcely causes generation of corrosive gas during molding works generation of stimulant gas, corrosive gas and black smoke when the resin composition is burned, and also has high flame retardancy, excellent electrical and mechanical properties and good smoke suppression.

Also, the electrical and electronic parts molded from the resin composition of the present invention have high flame retardancy, excellent electrical and mechanical properties and good smoke suppression, and are therefore very useful as parts of electrical and electronic devices.

EXAMPLES

The present invention is described in more detail with reference to the examples thereof, which examples however are merely intended to be illustrative and not to be construed as limiting the scope of the invention.

In the following Examples, all "parts" are by weight unless otherwise noted.

(1) Flammability

Flammability of the resin composition was evaluated by Underwriter's Laboratories Inc. UL-94 Standard Vertical Flame Test or by measuring the limiting oxygen index (LOI) according to ASTM D-2863, JIS K7201.

(2) Bleedout

The state of bleedout on a molded product was visually examined after keeping the molded product in the atmosphere at 120° C. for one hour.

(3) Halogen content

Pellets were burned and decomposed in an oxygen flask and diluted to 100 ml using 10 ml of a 0.3% hydrogen peroxide solution as an absorbing solution, and the halogen content in this 100 ml solution was determined by ion chromatography.

Examples 1, 2, 4 and 5

Polybutylene terephthalate (NOVADUR® produced by Mitsubishi Chemical Corporation) having an intrinsic viscosity of 0.85, decabromodiphenyl ether (DBDPE), erythritol (hydroxyl group concentration: $3.27 \times 10^{-2}$ eq/g) and antimony trioxide were blended in the ratios shown in Table 1 and the blend was kneaded at 250° C. and extruded into a strand by a 30 mm bent type twin-screw extruder and pelletized. The pellets were molded using an injection molder (J28SA manufactured by Nippon Steel Co., Ltd.), a molding die for UL 94 standard vertical flame test piece and a die for limiting oxygen index at a molding temperature of 250° C. and a die temperature of 85° C. Evaluation results are shown in Table 1. Results show that the obtained polybutylene resin compositions had very high flame retardancy.

Example 3

The same procedure as Example 1 was carried out except that the ratio of erythritol was changed from 1 part to 0.5 part, to obtain a molded product.

Example 6

The same procedure as Example 1 was carried out except that a brominated epoxy compound having the following structural formula was used in place of DBDPE, to obtain a molded product:

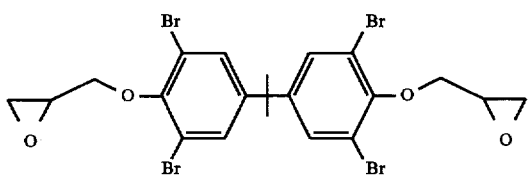

Example 7

The same procedure as Example 1 was repeated except that a TBA carbonate oligomer having the following structural formula was used in place of DBDPE, to obtain a molded product:

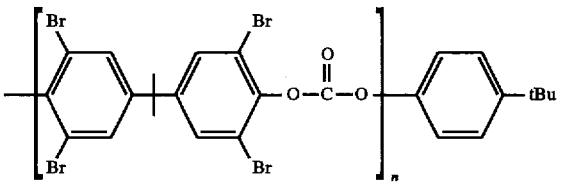

wherein n is about 7.

Example 8

The same procedure as Example 1 was carried out except for use of poly(pentabromobenzyl) acrylate (PBBPA) in place of DBDPE, to obtain a molded product.

Example 9

The same procedure as Example 8 was pursued except for using sorbitol in place of erythritol, to obtain a molded product.

Example 10

The same procedure as Example 8 was repeated except for use of pentaerythritol in place of erythritol, to obtain a molded product.

Example 11

The same procedure as Example 8 was carried out except for using 1,1,1-trimethylolpropane in place of erythritol, to obtain a molded product.

Example 12

The same procedure as Example 8 was performed except that the amount of antimony trioxide was 1.0 part, to obtain a molded product.

Comparative Example 1

The same procedure as Example 1 was carried out except that no erythritol was used, to obtain a molded product.

Comparative Example 2

The same procedure as Example 5 was carried out except that no erythritol was used, to obtain a molded product.

Comparative Example 3

The same procedure as Example 8 was carried out except that no erythritol was used, to obtain a molded product.

Comparative Example 4

The same procedure as Example 12 was carried out except that no erythritol was used, to obtain a molded product.

Comparative Example 5

The same procedure as Example 1 was carried out except that no erythritol was used, and that DBDPE in amount of 15 parts and antimony trioxide in amount of 4.5 parts were used, to obtain a molded product.

Evaluation results of Examples 1–12 and Comparative Examples 1–5 are shown in Table 1. The product of Comparative Example 5 gave rise to bleedout.

Example 13

Using 50 parts of PBT, 50 parts of a copolymer polyester obtained by copolymerizing a bromine-containing diol having the structural formula shown below, 1,4-butanediol and terephthalic acid, so that the bromine atom content would become 6% by weight, 6 parts of PBBPA, 1 part of erythritol and 2 parts of antimony trioxide, the same procedure as Example 1 was carried out, to obtain a molded product. Evaluation results are shown in Table 2.

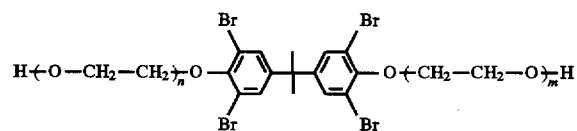

wherein 2<n+m<7, and a mean value of n+m is about 4.

Example 14

The same procedure as Example 13 was carried out except that PBT of 20 parts, the bromine-containing copolymer polyester of 80 parts and PBBPA of 3 parts were used, to obtain a molded product.

Example 15

The same procedure as Example 14 was carried out except that PBBPA, an external additive flame retardant, was not used, to obtain a molded product.

Example 16

The same procedure as Example 14 was carried out except that 100 parts of bromine-containing copolymer polyester was used instead of using 20 parts of PBT and 80 parts of bromine-containing copolymer polyester.

Example 17

The same procedure as Example 16 was carried out except that no PBBPA was used, to obtain a molded product.

Example 18

The same procedure as Example 17 was carried out except that 1 part, instead of 0.5 part, of erythritol was used, to obtain a molded product.

Example 19

The same procedure as Example 17 was carried out except that 0.5 part, instead of 1 part, of erythritol was used, to obtain a molded product.

Comparative Example 6

The same procedure as Example 14 was carried out except that no erythritol was used, to obtain a molded product.

Comparative Example 7

The same procedure as Example 15 was carried out except that no erythritol was used, to obtain a molded product.

Comparative Example 8

The same procedure as Example 16 was carried out except that no erythritol was used, to obtain a molded product.

Comparative Example 9

The same procedure as Example 17 was carried out except that no erythritol was used, to obtain a molded product.

Evaluation results of Examples 13–22 and Comparative Examples 6 to 9 are shown in Table 2.

Example 23

The same procedure as Example 13 was carried out except that no antimony trioxide was used, to obtain a molded product. Evaluation results are shown in Table 3. It is seen that a polyester resin composition with high flame retardancy can be obtained even when no antimony trioxide is used.

Example 24

The same procedure as Example 14 was carried out except that no antimony trioxide was used, to obtain a molded product.

Example 25

The same procedure as Example 15 was carried out except that no antimony trioxide was used, to obtain a molded product.

Example 26

The same procedure as Example 16 was carried out except that no antimony trioxide was used, to obtain a molded product.

Example 27

The same procedure as Example 17 was carried out except that no antimony trioxide was used, to obtain a molded product.

Example 28

The same procedure as Example 18 was carried out except that no antimony trioxide was used, to obtain a molded product.

Example 29

The same procedure as Example 27 was carried out except that 0.5 part, instead of 1 part, of erythritol was used, to obtain a molded product.

Example 30

The same procedure as Example 20 was carried out except that no antimony trioxide was used, to obtain a molded product.

Example 31

The same procedure as Example 21 was carried out except that no antimony trioxide was used, to obtain a molded product.

Example 32

The same procedure as Example 22 was carried out except that no antimony trioxide was used, to obtain a molded product.

Example 33

The same procedure as Example 8 was carried out except that no antimony trioxide was used, to obtain a molded product.

Comparative Example 10

The same procedure as Example 24 was carried out except that no erythritol was used, to obtain a molded product.

Comparative Example 11

The same procedure as Example 25 was carried out except that no erythritol was used, to obtain a molded product.

Comparative Example 12

The same procedure as Example 26 was carried out except that no erythritol was used, to obtain a molded product.

Comparative Example 13

The same procedure as Example 27 was carried out except that no erythritol was used, to obtain a molded product.

Comparative Example 14

The same procedure as Example 33 was carried out except that no erythritol was used, to obtain a molded product.

The results of Examples 23 to 33 and Comparative Examples 10 to 14 are shown in Table 3.

Examples 34–35 and Comparative Examples 15–17

Polybutylene terephthalate, bromine-containing copolymer polyester, poly(pentabromobenzyl) acrylate, antimony trioxide and pentaerythritol were blended in the ratios shown in Table 4, and the blends were worked as in Example 1, to obtain molded products.

Evaluation results of the molded products of Examples 34 to 35 and Comparative Examples 15 to 17 are shown in Table 4.

TABLE 1

| | PBT (wt parts) | DBDPE (wt parts) | Brominated epoxy (wt parts) |
|---|---|---|---|
| Example 1 | 100 | 10 | — |
| Example 2 | 100 | 10 | — |
| Example 3 | 100 | 10 | — |
| Example 4 | 100 | 10 | — |
| Example 5 | 100 | 8 | — |
| Example 6 | 100 | — | 10 |
| Example 7 | 100 | — | — |
| Example 8 | 100 | — | — |
| Example 9 | 100 | — | — |
| Example 10 | 100 | — | — |
| Example 11 | 100 | — | — |
| Example 12 | 100 | — | — |
| Comp. Example 1 | 100 | 10 | — |
| Comp. Example 2 | 100 | 8 | — |
| Comp. Example 3 | 100 | — | — |
| Comp. Example 4 | 100 | — | — |
| Comp. Example 5 | 100 | 15 | — |

| | TBA carbonate oligomer (wt parts) | PBBPA (wt parts) | Erythritol (wt parts) Hydroxyl group concentration in compound (milli eq/g) 32.7 |
|---|---|---|---|
| Example 1 | — | — | 1 |
| Example 2 | — | — | 0.5 |
| Example 3 | — | — | 0.05 |
| Example 4 | — | — | 5 |
| Example 5 | — | — | 1 |
| Example 6 | — | — | 1 |
| Example 7 | 10 | — | 1 |
| Example 8 | — | 10 | 1 |
| Example 9 | — | 10 | — |
| Example 10 | — | 10 | — |
| Example 11 | — | 10 | — |
| Example 12 | — | 10 | 1 |
| Comp. Example 1 | — | — | — |
| Comp. Example 2 | — | — | — |
| Comp. Example 3 | — | 10 | — |
| Comp. Example 4 | — | 10 | — |
| Comp. Example 5 | — | — | — |

| | Sorbitol (wt parts) | Pentaerythritol (wt parts) | Trimethylolpropane (wt parts) |
|---|---|---|---|
| | Hydroxyl group concentration in compound (milli equivalents/g) | | |
| | 33.0 | 29.4 | 22.5 |
| Example 1 | — | — | — |
| Example 2 | — | — | — |
| Example 3 | — | — | — |
| Example 4 | — | — | — |
| Example 5 | — | — | — |
| Example 6 | — | — | — |
| Example 7 | — | — | — |
| Example 8 | — | — | — |
| Example 9 | 1 | — | — |
| Example 10 | — | 1 | — |
| Example 11 | — | — | 1 |
| Example 12 | — | — | — |
| Comp. Example 1 | — | — | — |
| Comp. Example 2 | — | — | — |
| Comp. Example 3 | — | — | — |

TABLE 1-continued

|  | Antimony trioxide (wt parts) | LOI | UL94 | Bleedout | Br (wt %) |
|---|---|---|---|---|---|
| Example 1 | 3.0 | 34.1 | V-0 | Not observed | 7.3 |
| Example 2 | 3.0 | 33.2 | V-0 | Not observed | 7.3 |
| Example 3 | 3.0 | 31.1 | V-0 | Not observed | 7.4 |
| Example 4 | 3.0 | 30.5 | V-0 | Not observed | 7.1 |
| Example 5 | 2.5 | 31.1 | V-0 | Not observed | 6.0 |
| Example 6 | 3.0 | 32.6 | V-0 | Not observed | 4.6 |
| Example 7 | 3.0 | 32.3 | V-0 | Not observed | 4.6 |
| Example 8 | 3.0 | 32.9 | V-0 | Not observed | 6.3 |
| Example 9 | 3.0 | 32.1 | V-0 | Not observed | 6.3 |
| Example 10 | 3.0 | 31.8 | V-0 | Not observed | 6.3 |
| Example 11 | 3.0 | 30.5 | V-0 | Not observed | 6.3 |
| Example 12 | 1.0 | 30.8 | V-0 | Not observed | 6.5 |
| Comp. Example 1 | 3.0 | 30.1 | V-0 | Not observed | 7.4 |
| Comp. Example 2 | 2.5 | 28.4 | V-2 | Not observed | 6.0 |
| Comp. Example 3 | 3.0 | 28.2 | V-2 | Not observed | 6.4 |
| Comp. Example 4 | 1.0 | 26.4 | V-2 | Not observed | 6.5 |
| Comp. Example 5 | 4.5 | 32.0 | V-0 | observed | 10.5 |

TABLE 2

|  | PBT (wt parts) | Bromine-containing copolymer polyester (wt parts) | PBBPA (wt parts) |
|---|---|---|---|
| Example 13 | 50 | 50 | 6 |
| Example 14 | 20 | 80 | 3 |
| Example 15 | 20 | 80 | — |
| Example 16 | 0 | 100 | 3 |
| Example 17 | 0 | 100 | — |
| Example 18 | 0 | 100 | — |
| Example 19 | 0 | 100 | — |
| Example 20 | 0 | 100 | — |
| Example 21 | 0 | 100 | — |
| Example 22 | 0 | 100 | — |
| Comp. Example 6 | 20 | 80 | 3 |
| Comp. Example 7 | 20 | 80 | — |
| Comp. Example 8 | 0 | 100 | 3 |
| Comp. Example 9 | 0 | 100 | — |

|  | Erythritol (wt parts) | Sorbitol (wt parts) | Pentaerythritol (wt parts) | Trimethylolpropane (wt parts) |
|---|---|---|---|---|
| Hydroxyl group concentration in compound (milli eq/g) | 32.7 | 33.0 | 29.4 | 22.5 |
| Example 13 | 1 | — | — | — |
| Example 14 | 1 | — | — | — |
| Example 15 | 1 | — | — | — |
| Example 16 | 1 | — | — | — |
| Example 17 | 1 | — | — | — |
| Example 18 | 0.5 | — | — | — |
| Example 19 | 0.05 | — | — | — |
| Example 20 | — | 1 | — | — |
| Example 21 | — | — | 1 | — |
| Example 22 | — | — | — | 1 |
| Comp. | | | | |

TABLE 2-continued

|  | Antimony trioxide (wt parts) | LOI | UL94 | Bleedout | Br (wt %) |
|---|---|---|---|---|---|
| Example 13 | 2.0 | 33.1 | V-0 | Not observed | 6.7 |
| Example 14 | 2.0 | 31.2 | V-0 | Not observed | 6.6 |
| Example 15 | 2.0 | 30.5 | V-0 | Not observed | 6.6 |
| Example 16 | 2.0 | 32.1 | V-0 | Not observed | 7.7 |
| Example 17 | 2.0 | 30.8 | V-0 | Not observed | 5.8 |
| Example 18 | 2.0 | 29.5 | V-0 | Not observed | 5.8 |
| Example 19 | 2.0 | 28.0 | v-2 | Not observed | 5.9 |
| Example 20 | 2.0 | 29.9 | V-0 | Not observed | 5.8 |
| Example 21 | 2.0 | 29.2 | V-0 | Not observed | 5.8 |
| Example 22 | 2.0 | 29.0 | V-0 | Not observed | 5.8 |
| Comp. Example 6 | 2.0 | 26.2 | V-2 | Not observed | 6.6 |
| Comp. Example 7 | 2.0 | 25.5 | V-2 | Not observed | 4.7 |
| Comp. Example 8 | 2.0 | 27.5 | V-2 | Not observed | 7.8 |
| Comp. Example 9 | 2.0 | 26.6 | V-2 | Not observed | 5.9 |

TABLE 3

|  | PBT (wt parts) | Bromine-containing copolymer polyester (wt parts) | PBBPA (wt parts) |
|---|---|---|---|
| Example 23 | 50 | 50 | 6 |
| Example 24 | 20 | 80 | 3 |
| Example 25 | 20 | 80 | — |
| Example 26 | 0 | 100 | 3 |
| Example 27 | 0 | 100 | — |
| Example 28 | 0 | 100 | — |
| Example 29 | 0 | 100 | — |
| Example 30 | 0 | 100 | — |
| Example 31 | 0 | 100 | — |
| Example 32 | 0 | 100 | — |
| Example 33 | 100 | — | 10 |
| Comp. Example 10 | 20 | 80 | 3 |
| Comp. Example 11 | 20 | 80 | — |
| Comp. Example 12 | 0 | 100 | 3 |
| Comp. Example 13 | 0 | 100 | — |
| Comp. Example 14 | 100 | — | 10 |

|  | Erythritol (wt parts) | Sorbitol (wt parts) | Pentaerythritol (wt parts) | Trimethylolpropane (wt parts) |
|---|---|---|---|---|
| Hydroxyl group concentration in compound (milli eq/g) | 32.7 | 33.0 | 29.4 | 22.5 |
| Example 23 | 1 | — | — | — |
| Example 24 | 1 | — | — | — |
| Example 25 | 1 | — | — | — |
| Example 26 | 1 | — | — | — |
| Example 27 | 1 | — | — | — |
| Example 28 | 0.5 | — | — | — |
| Example 29 | 0.05 | — | — | — |
| Example 30 | — | 1 | — | — |
| Example 31 | — | — | 1 | — |
| Example 32 | — | — | — | 1 |

TABLE 3-continued

| | Antimony trioxide (wt parts) | LOI | UL94 | Bleedout | Br (wt %) |
|---|---|---|---|---|---|
| Example 33 | 1 | — | — | — | — |
| Comp. Example 10 | — | — | — | — | — |
| Comp. Example 11 | — | — | — | — | — |
| Comp. Example 12 | — | — | — | — | — |
| Comp. Example 13 | — | — | — | — | — |
| Comp. Example 14 | — | — | — | — | — |
| Example 23 | 0.0 | 29.9 | V-0 | Not observed | 6.8 |
| Example 24 | 0.0 | 29.2 | V-0 | Not observed | 6.7 |
| Example 25 | 0.0 | 26.5 | V-2 | Not observed | 4.8 |
| Example 26 | 0.0 | 29.2 | V-0 | Not observed | 7.8 |
| Example 27 | 0.0 | 27.1 | V-2 | Not observed | 5.9 |
| Example 28 | 0.0 | 26.5 | V-2 | Not observed | 6.0 |
| Example 29 | 0.0 | 25.8 | V-2 | Not observed | 6.0 |
| Example 30 | 0.0 | 27.5 | V-2 | Not observed | 5.9 |
| Example 31 | 0.0 | 26.8 | V-2 | Not observed | 5.9 |
| Example 32 | 0.0 | 26.9 | V-2 | Not observed | 5.9 |
| Example 33 | 0.0 | 30.2 | V-2 | Not observed | 6.5 |
| Comp. Example 10 | 0.0 | 24.7 | V-2 | Not observed | 6.8 |
| Comp. Example 11 | 0.0 | 23.3 | V-2 | Not observed | 6.0 |
| Comp. Example 12 | 0.0 | 24.5 | V-2 | Not observed | 7.9 |
| Comp. Example 13 | 0.0 | 24.0 | V-2 | Not observed | 6.0 |
| Comp. Example 14 | 0.0 | 25.9 | V-2 | Not observed | 6.5 |

TABLE 4

| | PBT (wt parts) | Bromine-containing copolymer polyester (wt parts) | PBBPA (wt parts) |
|---|---|---|---|
| Example 34 | 50 | 50 | 6 |
| Example 35 | 100 | 0 | 10 |
| Comp. Example 15 | 50 | 50 | 6 |
| Comp. Example 16 | 100 | 0 | 10 |
| Comp. Example 17 | 100 | 0 | 10 |

| | Antimony trioxide (wt parts) | Pentaerythritol (wt parts) | LOI |
|---|---|---|---|
| Example 34 | 0 | 1 | 29.4 |
| Example 35 | 1.0 | 1 | 31.5 |
| Comp. Example 15 | 0 | 0 | 25.4 |
| Comp. Example 16 | 1.0 | 0 | 26.5 |
| Comp. Example 17 | 6.0 | 0 | 31.2 |

| | UL94 | Elongation at break (%) | Specific gravity | Br content (wt %) |
|---|---|---|---|---|
| Example 34 | V-0 | 62 | 1.36 | 6.8 |
| Example 35 | V-0 | 50 | 1.38 | 6.5 |
| Comp. Example 15 | V-2 | 65 | 1.36 | 6.9 |
| Comp. Example 16 | V-2 | 54 | 1.38 | 6.5 |
| Comp. Example 17 | V-0 | 18 | 1.43 | 6.2 |

<Measuring method>

Elongation at break: measured according to ASTM D-638.

Specific gravity: measured according to ASTM D-792.

What is claimed is:

1. A flame-retardant polyester resin composition comprising:

(1) 100 parts by weight of a polyester resin which may contain a halogen atom, (2) 0.01 to 5 parts by weight of a polyhydric alcohol represented by the formula (I):

wherein $R^1$ and $R^2$ represent independently a hydrogen atom or a $C_1$–$C_3$ alkyl group; $R^3$ represents a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups; $R^4$ represents a hydrogen atom or a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups and may have a substituent, or the formula (II):

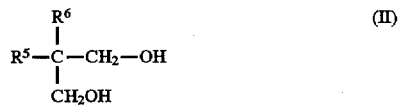

wherein $R^5$ represents a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups; and $R^6$ represents a hydrogen atom or a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups and may have a substituent;

(3) 0 to 20 parts by weight of an inorganic flame retarding synergist, and (4) 0 to 50 parts by weight of a halogen-based flame retardant, the halogen content in the composition being 0.1 to 20% by weight.

2. A flame-retardant polyester resin composition according to claim 1, wherein the halogen content is 1 to 15% by weight.

3. A flame-retardant polyester resin composition according to claim 1, wherein the compound of the formula (II) is pentaerythritol, dipentaerythritol or 1,1,1-trimethylolpropane.

4. A flame-retardant polyester resin composition according to claim 1, wherein the polyester resin is a polyester resin comprising (A) 0 to 100% by weight of polyalkylene terephthalate and (B) 0 to 100% by weight of a halogen-containing copolymer polyester obtained by copolymerizing an aromatic dicarboxylic acid or a derivative thereof, an alkylene glycol or a derivative thereof and a halogen-containing aromatic diol represented by the following formula (III) or a derivative thereof:

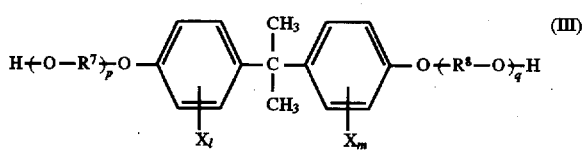

wherein $R^7$ and $R^8$ represent independently a $C_2$–$C_{30}$ alkylene group; X represents a halogen atom; l and m are each an integer of 1 to 4; and p and q are each an integer of 1 to 20.

5. A flame-retardant polyester resin composition according to claim 4, wherein the polyester resin is polyalkylene terephthalate.

6. A flame-retardant polyester resin composition according to claim 4, wherein the polyester resin is a halogen-containing copolymer polyester obtained by copolymerizing an aromatic dicarboxylic acid or a derivative thereof, an alkylene glycol or a derivative thereof, and a halogen-containing aromatic diol represented by the formula (III) or a derivative thereof.

7. Electric or electronic parts molded from a flame-retardant polyester resin composition of claim 1.

8. A flame-retardant polyester resin composition according to claim 4, wherein the polyester resin is a halogen-containing copolymer polyester represented by the following formula (IV):

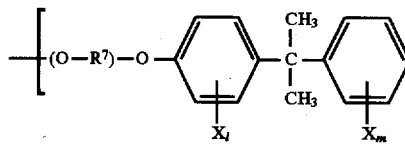

wherein $R^7$, $R^8$ and $R^{10}$ represent independently a $C_2$–$C_{30}$ alkylene group; $R^9$ and $R^{11}$ represent independently

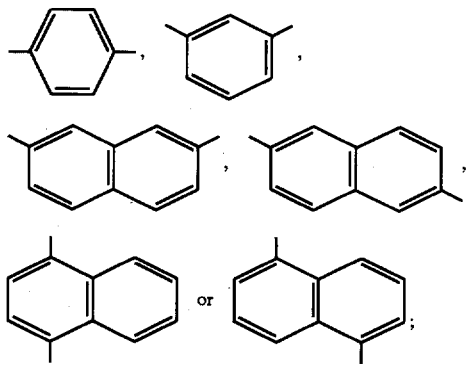

X represents a halogen atom; l and m are each an integer of 1 to 4; p and q are each an integer of 1 to 20; and r and s are each an integer of 1 or more.

9. A flame-retardant polyester resin composition according to claim 1, comprising:

(1) 100 parts by weight of a polyalkylene terephthalate resin;

(2) 0.01 to 5 parts by weight of a polyhydric alcohol represented by the formula (I):

wherein $R^1$ and $R^2$ represent independently a hydrogen atom or a $C_1$–$C_3$ alkyl group; $R^3$ represents a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups; $R^4$ represents a hydrogen atom or a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups and may have a substituent, or the formula (II):

wherein $R^5$ represents a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl

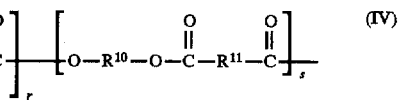

groups; and $R^6$ represents a hydrogen atom or a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups and may have a substituent;

(3) 0 to 20 parts by weight of an inorganic flame retarding synergist, and (4) 1 to 50 parts by weight of a halogen-based flame retardant, the halogen content in the composition being 0.1 to 20% by weight.

10. A flame-retardant polyester resin composition according to claim 1, comprising:

(1) 100 parts by weight of a halogen-containing copolymer polyester represented by the formula (IV):

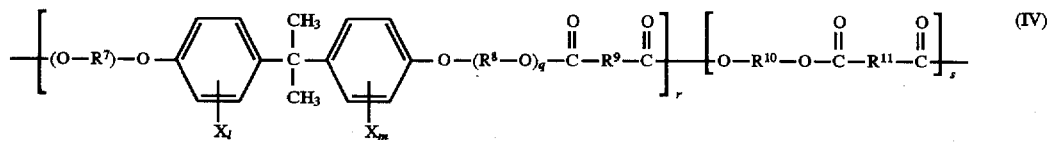

wherein $R^7$, $R^8$ and $R^{10}$ represent independently a $C_2$–$C_{30}$ alkylene group; $R^9$ and $R^{11}$ represent independently

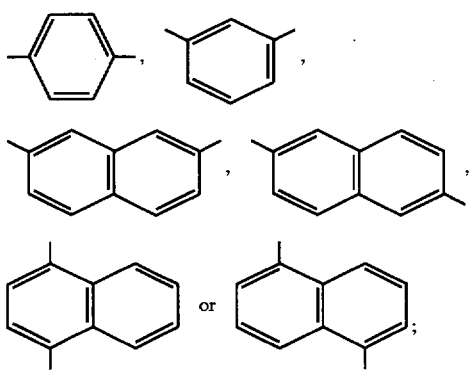

X represents a halogen atom; l and m are each an integer of 1 to 4; p and q are each an integer of 1 to 20; and r and s are each an integer of 1 or more;

(2) 0.01 to 5 parts by weight of a polyhydric alcohol represented by the formula (I):

wherein $R^1$ and $R^2$ represent independently a hydrogen atom or a $C_1$–$C_3$ alkyl group; $R^3$ represents a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups; $R^4$ represents a hydrogen atom or a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups and may have a substituent, or the formula (II):

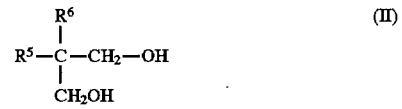

wherein $R^5$ represents a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups; and $R^6$ represents a hydrogen atom or a $C_1$–$C_{30}$ alkyl, $C_3$–$C_{30}$ cycloalkyl, $C_6$–$C_{30}$ aryl, $C_1$–$C_{30}$ alkoxy or $C_6$–$C_{30}$ aryloxy group, which have one or more hydroxyl groups and may have a substituent; and (3) 0 to 20 parts by weight of an inorganic flame retarding synergist, (4) 0 to 50 parts by weight of a halogen-based flame retardant, the halogen content in the composition being 0.1 to 20% by weight.

* * * * *